United States Patent
Zhang et al.

(10) Patent No.: US 7,872,737 B2
(45) Date of Patent: Jan. 18, 2011

(54) SYSTEM AND METHOD FOR OPTICAL TIME DOMAIN REFLECTOMETRY USING MULTI-RESOLUTION CODE SEQUENCES

(75) Inventors: Hongbin Zhang, Marlboro, NJ (US); Ralph Brian Jander, Freehold, NJ (US); Charles Breverman, East Brunswick, NJ (US); Ram M. Engira, Neptune, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 727 days.

(21) Appl. No.: 11/829,481

(22) Filed: Jul. 27, 2007

(65) Prior Publication Data

US 2009/0027656 A1 Jan. 29, 2009

(51) Int. Cl.
*G01N 21/00* (2006.01)
(52) U.S. Cl. .................................... 356/73.1
(58) Field of Classification Search .............. None
See application file for complete search history.

(56) References Cited

U.S. PATENT DOCUMENTS

| | | | |
|---|---|---|---|
| 5,000,568 A | 3/1991 | Trutna | |
| 5,825,479 A * | 10/1998 | Thompson et al. | 356/73.1 |
| 6,388,741 B1 | 5/2002 | Beller | |
| 7,187,860 B2 | 3/2007 | Bergano et al. | |
| 7,274,441 B2 * | 9/2007 | Payton | 356/73.1 |
| 2007/0091297 A1 | 4/2007 | Beller | |

OTHER PUBLICATIONS

Nazarathy, "Real-Time Long Range Complementary Correlation Optical Time Domain Reflectometer," Journal of Lightwave Technology. vol. 7, No. 1, Jan. 1989, pp. 24-38.
International Search Report and Written Opinion dated Oct. 22, 2008 issued in related International Patent Application No. PCT/US2008/071394.

* cited by examiner

*Primary Examiner*—Tu T Nguyen
(74) *Attorney, Agent, or Firm*—Grossman, Tucker, Perreault & Pfleger, PLLC

(57) ABSTRACT

A system and method for time domain reflectometry (OTDR) using multi-resolution code sequences. One or more subsets of a set of predefined complementary code sequences may be transmitted as an OTDR signal to provide multi-resolution capability.

20 Claims, 6 Drawing Sheets

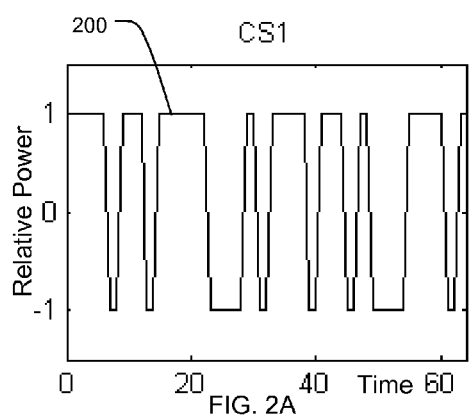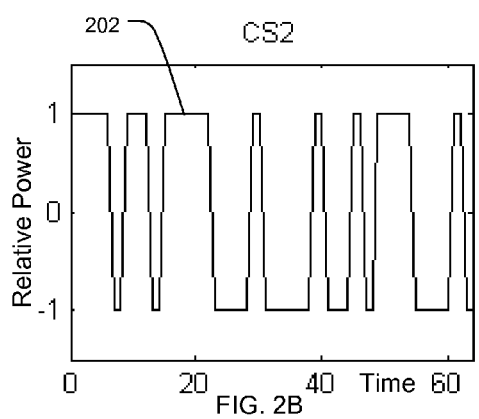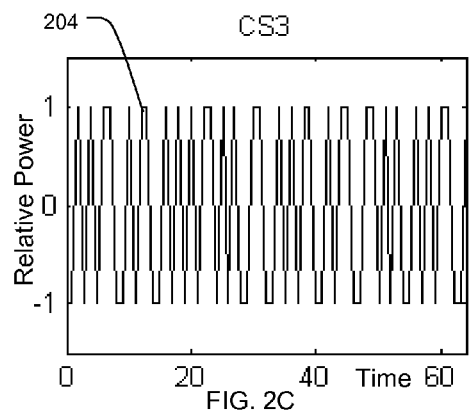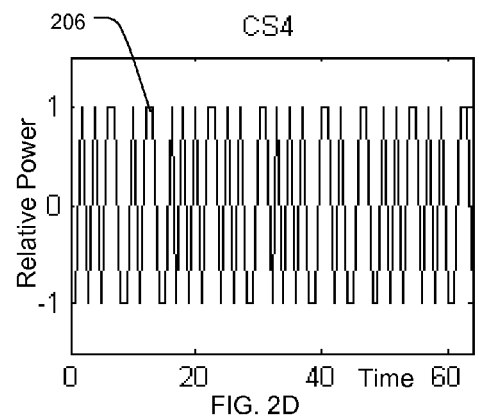

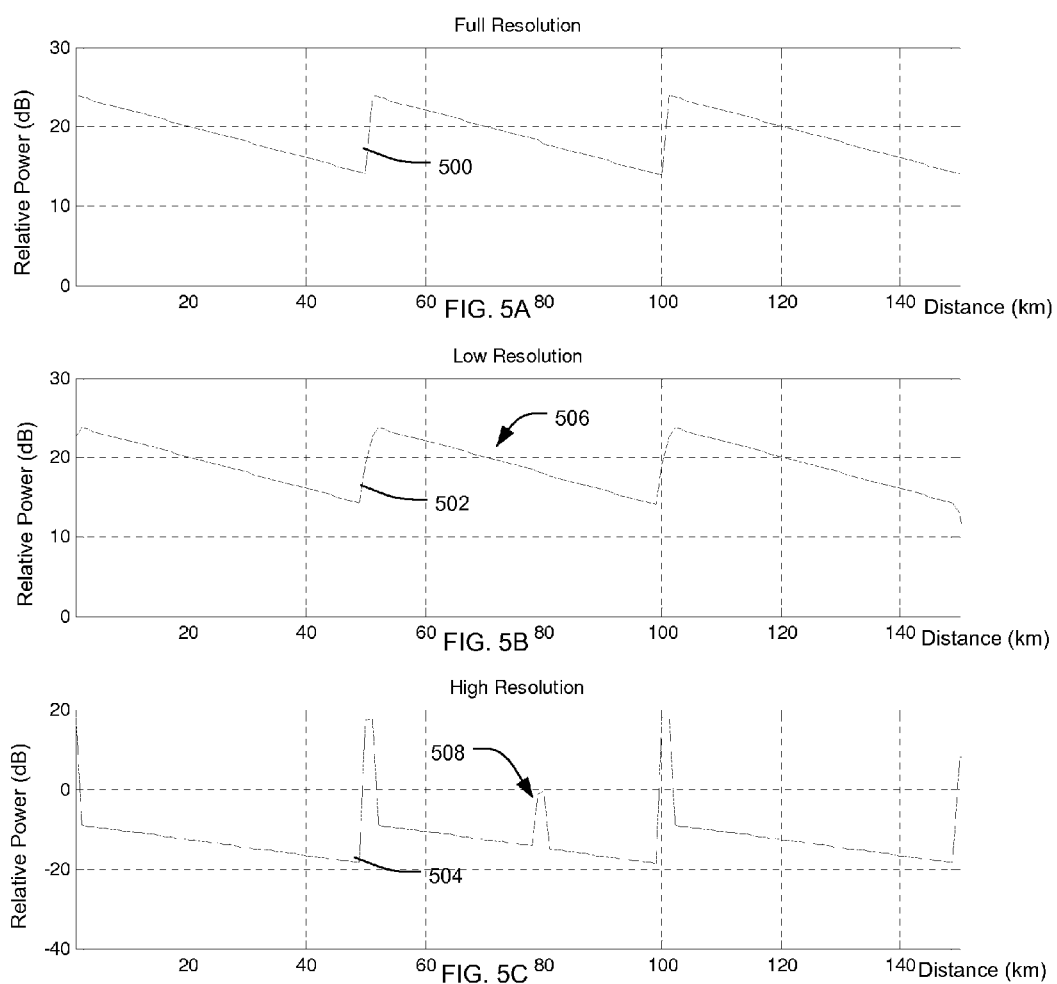

SYSTEM AND METHOD FOR OPTICAL TIME DOMAIN REFLECTOMETRY USING MULTI-RESOLUTION CODE SEQUENCES

TECHNICAL FIELD

The present application relates to communication systems and, more particularly, to a system and method for optical time domain reflectometry using a set or sets of multi-resolution code sequences.

BACKGROUND

In long distance fiber optic communication systems it may be important to monitor the health of the system. For example, a monitoring may be implemented to detect faults or breaks in the fiber optic cable, faulty repeaters or amplifiers or other problems with the system.

Known monitoring techniques include use of optical time domain reflectometry ("OTDR") equipment that may generate a test signal representing a predefined bit sequence. The OTDR equipment may transmit the test signal with the information signals, e.g. in wavelength division multiplexed system. The test signal may be returned to the OTDR equipment through reflection in a transmit path and/or through a return path within an amplifier or repeater. The OTDR equipment may then separate the returned test signal from the data signals, and process the test signal to examine the health of the transmission system.

BRIEF DESCRIPTION OF THE DRAWINGS

Reference should be made to the following detailed description which should be read in conjunction with the following figures, wherein like numerals represent like parts:

FIGS. 2A through 2D include plots of a set of four exemplary complementary test code sequences;

FIGS. 5A through 5C include plots representative of the OTDR waveforms that may result from the four exemplary test code sequences illustrated in FIGS. 2A through 2D.

DETAILED DESCRIPTION

Figure 1:
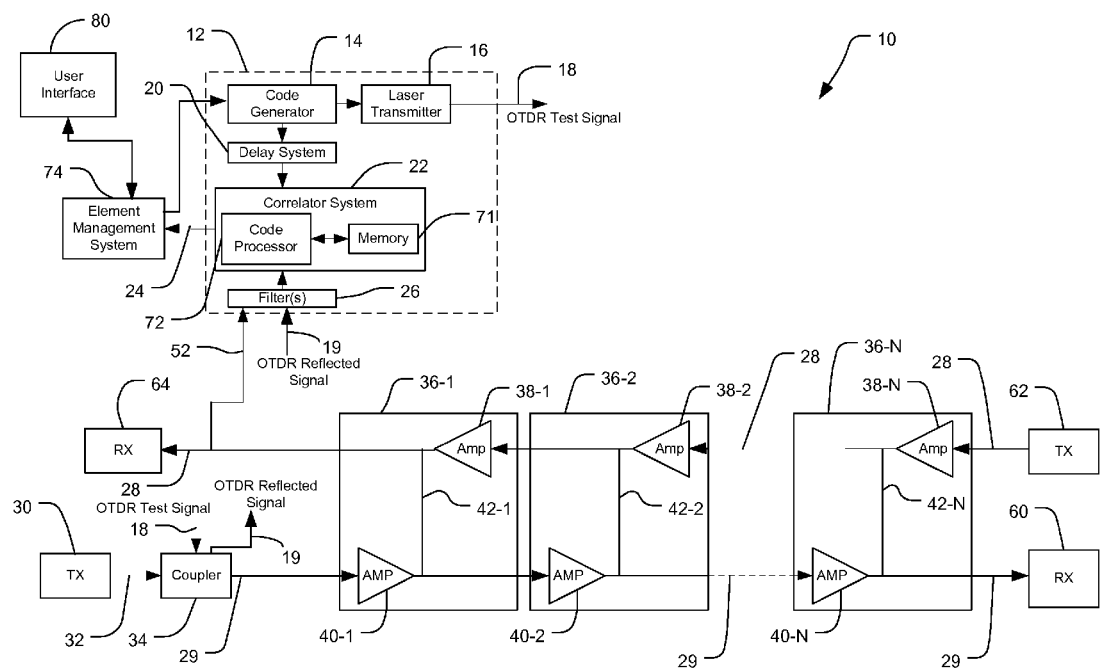
FIG. 1 is a simplified block diagram of one exemplary embodiment of a system consistent with the present disclosure.

FIG. 1 is a simplified block diagram of one exemplary embodiment of a WDM transmission system 10 including optical time domain reflectometry (OTDR) equipment 12 consistent with the present disclosure. In general, the system 10 may be configured for selectively sending an OTDR test signal of a desired resolution, e.g. low and/or high resolution, and calculating a system response waveform. A low resolution test signal may, for example, allow detection and location of Rayleigh backscattering the system, whereas a high resolution signal may allow detection and location of discrete discontinuities, such as extra fiber loss, in the system. A combination of system response from low and high resolution system response data may provide a full system response.

Those of ordinary skill in the art will recognize that the system 10 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

In the illustrated exemplary embodiment, the transmission system 10 includes a laser transmitter 30 and an optical fiber pair, including fibers 28 and 29, for carrying optical signals. Fibers 28 and 29 may be long distance optical fiber lines for deployment, for example, under the ocean. Optical fibers 28 and 29 may be unidirectional fibers and carry signals in opposite directions. Fibers 28 and 29 together establish a bidirectional path for transmitting signals. While the illustrated exemplary monitoring system may be described as monitoring a transmission system including two unidirectional fibers 28 and 29, a system consistent with the present disclosure may be used to monitor transmission systems employing a single bidirectional fiber.

Laser transmitter 30 may be a wavelength-division multiplexing (WDM) transmitter configured to transmit optical data on a plurality of channels (or wavelengths) over fiber 29 to a WDM receiver 60. The transmitter and receiver, of course, are shown in highly simplified form for ease of explanation. Laser transmitter 30 may include a plurality of laser transmitters each transmitting an optical data signal using a different channel or wavelength, and a multiplexer for combining the data signals into an aggregate signal transmitted over fiber 29. The receiver may demultiplex and detect the transmitted data signals. Similarly, WDM data signals may be transmitted over fiber 28 from a transmitter 62 to a receiver 64, i.e. in a direction opposite of those signals on fiber 29. Alternatively, only a single channel of data may be carried on fibers 28 and/or 29.

The optical time domain reflectometry equipment (OTDR) 12 may be configured for monitoring the health of the system 10. In the illustrated exemplary embodiment, the OTDR 12 includes a code generator 14, a laser transmitter 16, a delay system 20, a correlator system 22 including a code processor 72 and computer readable memory 71, and a filter 26. OTDR 12 may be configured to provide an output 24, e.g. system response data, to an element management system 74 when a test is being conducted on the system 10. Element management system 74 may convert this data into graphical form, for example, a plot of magnitude versus time, for output to a user interface 80. Element management system 74 may also receive an input from the user interface 80 to cause the OTDR 12 transmit selected test codes.

The code generator 14 may be configured for generating and outputting a test code, such as a sequence of non-periodic complementary codes, in response to a user input at a user interface 80. A variety of code generators and code configurations are known to those of ordinary skill in the art. The output of the code generator 14 may be coupled to the laser transmitter 16. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The laser transmitter 16 may take a known configuration, e.g. a distributed feedback laser (DFB), and may be configured to produce an optical output at a carrier wavelength $\lambda_0$ that may be different from the wavelengths of all of the data channels to be transmitted on the transmission system. The carrier wavelength $\lambda_0$ may, for example, by at an edge of the spectral bandwidth of the system or may be between data channels. In one embodiment, the laser transmitter may be configured to provide an optical output at a plurality of different carrier wavelengths. The power of the laser output may be set below the power level of the data signals communicated over fibers 28 and 29 to minimize the impairment of the data signals.

Laser transmitter 16 may generate an OTDR test signal representative of the code received from code generator 14. The OTDR test signal may be provided as an OTDR test signal output 18 of the laser transmitter 16. In one embodiment, the output of the code generator may directly modulate the amplitude of the laser output. Other configurations for imparting the code to the output light from the laser transmitter are known. For example, the code may be imparted by an amplitude or other modulator coupled to an output of the laser transmitter 16.

In the illustrated exemplary embodiment, a coupler 34 may combine the WDM data 32 from transmitter 30 and OTDR test signal 18 and output this combined signal for transmission onto fiber 29. A plurality of optical repeaters 36-1, 36-2 . . . 36-N may be coupled to the optical fibers 28 and 29. Each repeater may include a first amplifier 40-1, 40-2 . . . 40-N, respectively, for amplifying optical signals transmitted over fiber 29 to receiver 60, and a second amplifier 38-1, 38-2 . . . 38-N, respectively, for amplifying optical signals transmitted over fiber 28 to receiver 64. Each repeater may also include an associated OTDR path 42-1, 42-2 . . . 42-N, e.g. an OTDR return path, which couples a reflected signal from fiber 29 to fiber 28 for transmission back to OTDR 12.

Signal 52 may be coupled to the filter 26, and may carry all signals present on fiber 28, including the combined WDM data 32 and reflected OTDR test 18 signals returned by OTDR paths 42-1, 42-2 . . . 42-N over fiber 28. OTDR reflected signal 19 may be coupled to the filter 26, and may carry all reflected signals present on fiber 29, including reflected WDM data 32 and reflected OTDR test signals 18 that may be reflected between the coupler 34 and the first repeater 36-1. Filter 26 may be wavelength selective and pass only the wavelengths of the OTDR test signal 18 to the correlator 22.

To facilitate a correlation operation by correlator 22, delay system 20 may receive the transmitted codes from code generator 14 and output the associated delayed codes to correlator 22. Delay system 20 may output each code after the time delay corresponding to the time required for receipt of a complete reflected OTDR test signal for the system 10 under test.

Correlator 22 may then correlate the reflected OTDR test signal with delayed codes from the delay system 20. Correlator 22 may correlate electrical signals or optical signals. Where correlator 22 correlates electrical signals, OTDR 12 may further include an optical-to-electrical converter connected between filter 26 and the correlator 22 for converting the optical signals output by filter 26 into electrical signals.

In the correlation operation, code processor 72 may be configured to calculate a first correlation of a first OTDR test signal with its associated first OTDR reflected signal. The correlator 22 may then store the first correlation results in memory 71. The code processor 72 may be further configured to calculate a second correlation of a second OTDR test signal with its associated second OTDR reflected signal. The correlator 22 may then be configured to add the second correlation results to the first correlation results and store the sums in memory 71. The sums may then represent an amplified response of the system 10 under test.

The correlator 22 may then output the system response data 24 to the element management system 74. The element management system 74 may generate a graphical representation of the system response data for display by the user interface 80. A user may evaluate the displayed system response and determine whether further test data may be desired. If further test data is desired, the user may provide an input at the user interface to cause the OTDR equipment 12 to provide a second set of test signals and repeat the correlation process.

For example, a user may initially elect to send a first set of test signals configured to provide a system response having relatively low resolution. Such low resolution test signals may produce a system response indicating signal loss over the length of the system 10 under test. If the system response is deemed insufficient in showing desired resolution, a user may then elect to send a second set of signals configured to provide a system response having relatively high resolution. Such high resolution test signals may produce a system response useful for determining a location or locations of discrete reflectors, for example, discontinuities in the fiber 29. The low and high resolution system response data may be combined to yield full resolution system response waveforms. Additional sets of sequences may provide additional levels of resolution. Also, a user may initially elect to send high resolution test signals if the need for a high resolution system response is known.

The OTDR equipment 12 may be configured to generate one or more sets of possible codes. Each code may be a sequence of bits where each bit may be 1, or −1. Each sequence may have a length N where N is the number of bits in the sequence. A user may select a subset of these codes that may be used as test codes to generate one or more OTDR test signals, for example OTDR test signal 18 in FIG. 1. In one embodiment, a set of a plurality of test codes may include complementary sequences. In another embodiment, a set of codes may include mutually orthogonal complementary sets of sequences.

A set of sequences may be understood to be complementary if the sum of their autocorrelations is zero for all nonzero shifts. In other words, a set of sequences $(A_i, 1 \leq i \leq M)$ is a complementary set of sequences if:

$$\sum_{i=1}^{M} \psi_{A_i A_i}(l) = 0 \ \forall\, l \neq 0$$

where $\psi A_i, A_i$ is the autocorrelation function of a sequence $A_i$, and $$\psi_{A_i, A_i}(l) = \sum_n A_i(n) A_i(n-l)$$

is the lth element in $\psi A_i, A_i$.

Complementary sets of sequences may be said to be mutually orthogonal complementary sets of sequences if any two are mates to each other. In other words, a set of sequences $(B_i, 1 \leq i \leq M)$ may be said to be a mate of the set of sequences $(A_i, 1 \leq i \leq M)$ if:

the length of $A_i$ is equal to the length of $B_i$, for $1 \leq i \leq M$;
the set $(B_i, 1 \leq i \leq M)$ is a complementary set; and $$\sum_{i=1}^{M} \psi_{A_i B_i}(l) = 0 \; \forall \; l;$$

where $\psi_{A_i,B_i}$ is a cross correlation function of the sequences $A_i$ and $B_i$, and $$\psi_{A_i,B_i}(l) = \sum_{n} A_i(n) B_i(n-l)$$

is the lth element in $\psi_{A_i,B_i}$.

For example, mutually orthogonal complementary sets of sequences may be generated using an iterative process and beginning with a pair of Golay sequences, $A_1$, and $A_2$. $A_1$ and $A_2$ may initially include one element. As a result of a first iteration, the resulting set may include two sequences that may be of length two. The set resulting from the first iteration then may be the input to the second iteration. The set resulting from the second iteration may include two sequences that may be of length four. The iterative process may continue until a set of sequences of a desired length may be achieved. In equation form, each iterative step may be defined as:

$$\begin{Bmatrix} A_1 \\ A_2 \end{Bmatrix} \rightarrow \begin{Bmatrix} A_1 | A_2 \\ A_1 | -A_2 \end{Bmatrix}$$

where $-A$ is the negation of the sequence $A$, and $|$ signifies the concatenation of sequences. The result of the prior iteration becomes the input to the next iteration. For example, beginning with a one element Golay pair $(1,1)$, codes of length 2, 4, and 8 may be generated as follows:

$$\begin{Bmatrix} 1 \\ 1 \end{Bmatrix} \rightarrow$$

$$\begin{Bmatrix} 1 & 1 \\ 1 & -1 \end{Bmatrix} \rightarrow \begin{Bmatrix} 1 & 1 & 1 & -1 \\ 1 & 1 & -1 & 1 \end{Bmatrix} \rightarrow \begin{Bmatrix} 1 & 1 & 1 & -1 & 1 & 1 & -1 & 1 \\ 1 & 1 & 1 & -1 & -1 & -1 & 1 & -1 \end{Bmatrix}$$

A mate of a complementary set may be generated as follows. If $(A_i, 1 \leq i \leq M)$ is a complementary set having an even number of sequences, then $(\tilde{A}_2, (-\tilde{A}_1), \tilde{A}_4, (-\tilde{A}_3), \ldots, \tilde{A}_M, (-\tilde{A}_{M-1}))$ may be one of its mates where $\tilde{A}$ is the reverse of the sequence $A$, and $-\tilde{A}$ is the reverse of the negation of the sequence $A$. For example, given a complementary set $(A_1, A_2)$, for example a Golay pair, a mate to this set may be $$(\tilde{A}_2, (-\tilde{A}_1)).$$

Combining the complementary set with its mate, in matrix form, yields:

$$\Delta = \begin{bmatrix} A_1 & \tilde{A}_2 \\ A_2 & -\tilde{A}_1 \end{bmatrix}$$

where each column of the matrix may be mutually orthogonal. Further, if $\Delta$ is a matrix of sequences whose columns are mutually orthogonal complementary sets, and matrix $\Delta'$ is constructed from $\Delta$ as:

$$\Delta' = \begin{bmatrix} \Delta \otimes \Delta & -\Delta \otimes \Delta \\ -\Delta \otimes \Delta & \Delta \otimes \Delta \end{bmatrix}$$

where $\otimes$ denotes interleaving, then the columns of $\Delta'$ are also mutually orthogonal complementary sets. The interleaving of two sequences $A = \{a_1, a_2, \ldots, a_N\}$ and $B = \{b_1, b_2, \ldots, b_N\}$ may be defined as: $A \otimes B = \{a_1, b_1, a_2, b_2, \ldots, a_N, b_N\}$. The interleaving of two matrices of sequences may be performed on a component-by-component basis. For example, four mutually orthogonal sets of complementary sequences may be generated from a pair of Golay sequences $\{A_1; A_2\}$ as the following:

$$\Delta' = \begin{bmatrix} A_1 \otimes A_1 & \tilde{A}_2 \otimes \tilde{A}_2 & -A_1 \otimes A_1 & -\tilde{A}_2 \otimes \tilde{A}_2 \\ A_2 \otimes A_2 & -\tilde{A}_1 \otimes -\tilde{A}_1 & -A_2 \otimes A_2 & \tilde{A}_1 \otimes -\tilde{A}_1 \\ -A_1 \otimes A_1 & -\tilde{A}_2 \otimes \tilde{A}_2 & A_1 \otimes A_1 & \tilde{A}_2 \otimes \tilde{A}_2 \\ -A_2 \otimes A_2 & \tilde{A}_1 \otimes -\tilde{A}_1 & A_2 \otimes A_2 & -\tilde{A}_1 \otimes -\tilde{A}_1 \end{bmatrix}$$

In this example, each column of the matrix $\Delta'$ may be a set of complementary sequences and may be a mate of the other column. The code length of the constructed (i.e., interleaved) complementary sequence may be twice of the length of the Golay sequences $\{A_1; A_2\}$.

In one exemplary embodiment, a user and/or the element management system 74 may select any column of $\Delta'$ as a test signal or signals and the sum of autocorrelations may have nonzero value at zero shifts. In other words, if $\Delta_{ij}$ is the ijth sequence in the above matrix, i.e., $\Delta_{11} = A_1 \otimes A_1, \Delta_{21} = A_2 \otimes A_2, \Delta_{31} = -A_1 \otimes A_1, \Delta_{41} = -A_2 \otimes A_2, \ldots$, then the sum of autocorrelation functions of the kth column of $\Delta'$ is $$\sum_{i=1}^{4} \psi_{\Delta_{ik} \Delta_{ik}}(l) = \delta(l), k = 1, 2, 3, 4$$

and the sum of cross correlation functions of the first and k th columns of $\Delta'$ is $$\sum_{i=1}^{4} \psi_{\Delta_{i1} \Delta_{ik}}(l) = 0, \; \forall \; l, k = 2, 3, 4.$$

In other words, by selecting one or more sequences of a column of $\Delta'$, for example the first column, as a test signal or signals, a user and/or the element management system 74 may have selected a complementary set of sequences. As the following exemplary embodiments illustrate, test signals constructed from a complementary set of sequences may allow iterative testing of a transmission system, for example, system 10 of FIG. 1, and may achieve a desired resolution without sacrificing signal to noise ratio. The user and/or element management system 74 may select a first subset of the selected set of sequences for transmission, for example, $\Delta_{11}$ and $\Delta_{21}$ of $\Delta'$. The first subset of the selected set of sequences may provide low resolution system response data. Such low resolution may indicate signal loss over the length of the system under test, for example, system 10 of FIG. 1. The user and/or element management system 74 may evaluate the low resolution system response data and may determine whether a desired resolution has been achieved.

If the desired resolution has not been achieved, the user and/or element management system 74 may select a second subset of the selected set of test sequences for transmission, for example, $\Delta_{31}$ and $\Delta_{41}$ of $\Delta'$. The second subset may provide higher resolution system response data. Such high resolution may be useful for determining a location or locations of discrete reflectors, for example, discontinuities in the fiber 29 of FIG. 1. The user and/or element management system 74 may evaluate the higher resolution system response data and may determine whether a desired resolution has been achieved. The process may continue until a desired resolution has been achieved.

Consistent with the present disclosure, a first subset of the selected set of test sequences may be selected to provide higher resolution system response data and the second subset of the selected set of test sequences may be selected to provide relatively low resolution system response data. In either embodiment, the low and high resolution data may be combined to yield full resolution system response waveforms. Additional sets of sequences may provide additional levels of resolution.

FIGS. 2A through 2D include plots of relative power vs. time illustrating an exemplary set of four complementary code sequences consistent with the present disclosure. FIG. 2A includes a plot 200 of a low resolution sequence CS1 consistent with the present disclosure. FIG. 2B includes a plot 202 of another low resolution sequence CS2 consistent with the present disclosure. FIG. 2C includes a plot 204 of a higher resolution sequence CS3 consistent with the present disclosure. FIG. 2D includes a plot 206 of another high resolution sequence CS4 consistent with the present disclosure.

The four sequences CS1, CS2, CS3, CS4, illustrated in FIGS. 2A through 2D, respectively, may be created using the procedure outlined above. For example, a pair of Golay sequences $\{A_1;A_2\}$ where $A_1$ and $A_2$ each have length N=32 elements, may be created using the procedure outlined above. From this set of Golay sequences, the four code sequences CS1, CS2, CS3, CS4, may be created as:

CS1=$A_1 \otimes A_1$
CS2=$A_2 \otimes A_2$
CS3=$-A_1 \otimes A_1$
CS4=$-A_2 \otimes A_2$ where, as above, ⊗denotes interleaving.

Figure 3A:
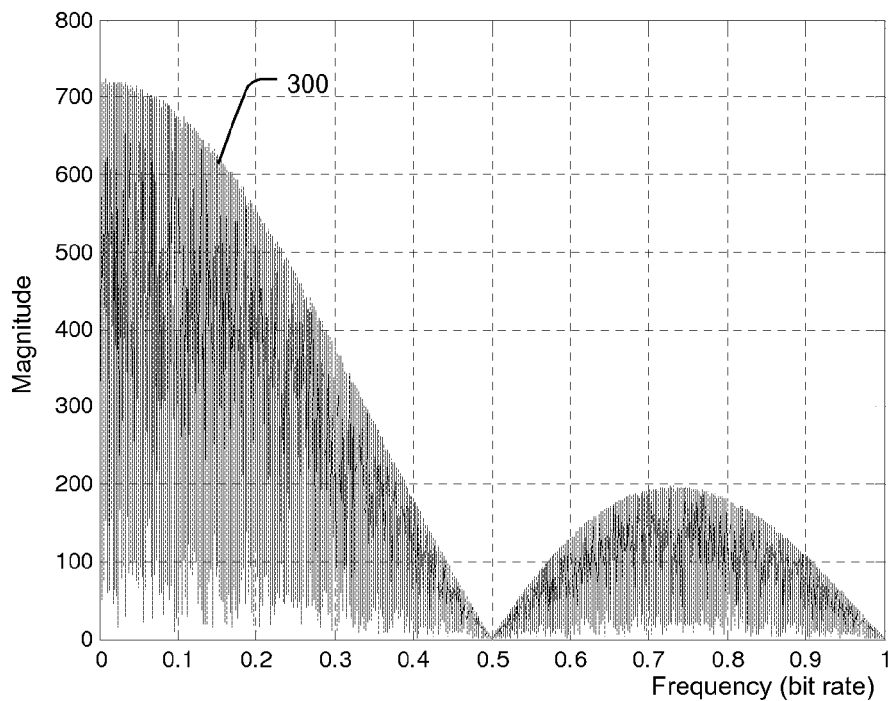
FIGS. 3A and 3B include plots of the Fourier spectra of FIGS. 2A and 2B and FIGS. 2C and 2D, respectively.
Figure 3B:
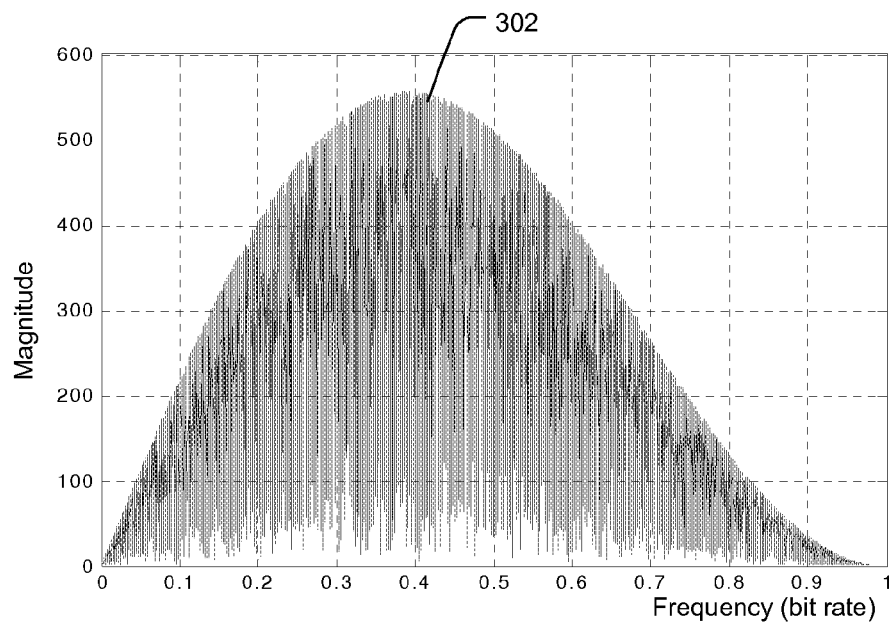

FIGS. 3A and 3B illustrate exemplary plots 300, 302 of the Fourier spectra of the exemplary code sequences shown in FIGS. 2A and 2B and FIGS. 2C and 2D, respectively. As shown, the Fourier spectrum for the low resolution sequences CS1 and CS2 (shown, for example, in FIGS. 2A and 2B, respectively), may have a maximum amplitude at a lower frequency than the maximum amplitude associated with the spectrum for CS3 and CS4 (shown, for example, in FIGS. 2C and 2D, respectively). It may be appreciated that a sequence having a Fourier spectrum with a maximum amplitude at a relatively lower frequency may provide lower resolution system response data while a sequence having a Fourier spectrum with a maximum amplitude at a relatively higher frequency may provide higher resolution system response data.

Figure 4A:
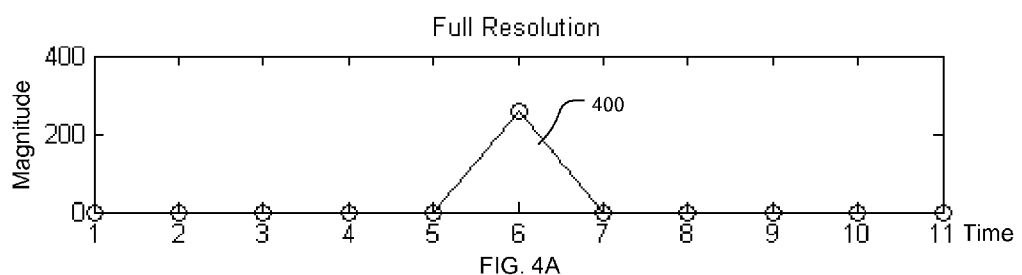
FIGS. 4A through 4C include plots of the sums of the autocorrelations of the pairs of exemplary sequences illustrated in FIGS. 2A through 2D for low, high and full resolution.
Figure 4B:
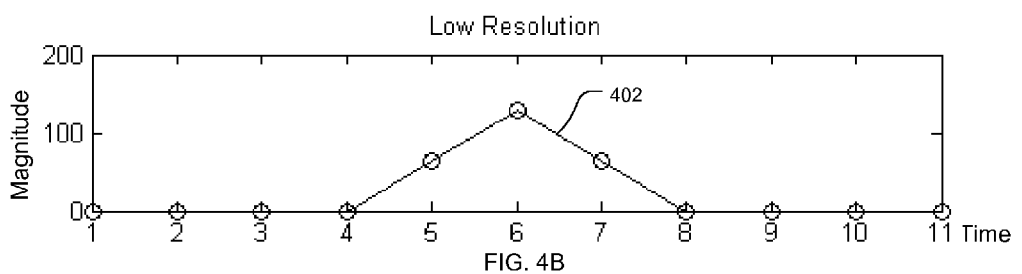
Figure 4C:
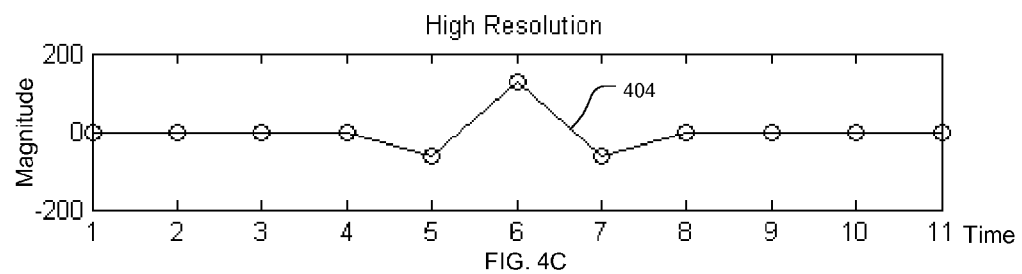

FIGS. 4A through 4C include plots 400, 402, 404 of the sums of the autocorrelation functions of the four exemplary code sequences shown in FIG. 2. FIG. 4A illustrates the sum of the autocorrelation functions of the four code sequences CS1, CS2, CS3, CS4, $\psi_{CS_1CS_1}(n)+\psi_{CS_2CS_2}(n)+\psi_{CS_3CS_3}(n)+\psi_{CS_4CS_4}(n)$, in graphical form. Likewise, FIG. 4B illustrates the sum $\psi_{CS_1CS_1}(n)+\psi_{CS_2CS_2}(n)$ of the autocorrelation functions of the two code sequences CS1 and CS2, and FIG. 4C illustrates the sum of the autocorrelation functions of the remaining two code sequences CS3 and CS4, $\psi_{CS_3CS_3}(n)+\psi_{CS_4CS_4}(n)$.

In this exemplary embodiment, the two code sequences CS1 and CS2, may produce low resolution system response data while the two code sequences CS3 and CS4, may produce high resolution system response data. For example, a user may elect to send CS1 and CS2 as low resolution test signals. The correlator may receive reflected portions of CS1 and CS2 returned to the OTDR equipment from the system, and may calculate a first correlation of CS1 with the reflected portion of CS1 and a second correlation of CS2 with a reflected portion of CS2. The correlator 22 may then add the first correlation results to the second correlation results and store the sum in memory 71. Since CS1 and CS2 are low resolution complementary sequences, the sums of the correlation results may represent an amplified low resolution response of the system 10 under test.

A user may also, or alternatively, elect to send CS3 and CS4 as high resolution test signals. The correlator may receive reflected portions of CS3 and CS4 returned to the OTDR equipment from the system, and may calculate a first correlation of CS3 with the reflected portion of CS3 and a second correlation of CS4 with a reflected portion of CS4. The correlator 22 may then add the first correlation results to the second correlation results and store the sum in memory 71. Since CS3 and CS4 are high resolution complementary sequences, the sums of the correlation results may represent an amplified high resolution response of the system 10 under test.

The low resolution system response data may indicate losses over a length of fiber e.g., fiber 29 in FIG. 1, while the high resolution system response data may indicate localized changes such as a those that may be produced by a repeater or a fiber discontinuity. The full resolution system response data may be calculated as a sum of the low resolution system response data and the high resolution system response data.

FIGS. 5A through 5C illustrate exemplary system response waveforms 500, 502, 504 for an exemplary system extending 150 km and having a 50 km repeater spacing. The response waveforms are shown as relative power in dB, plotted on a log scale, versus distance in kilometers, and were obtained using the test code sequences shown in FIGS. 2A through 2D. The FIG. 5A illustrates an exemplary full resolution system response waveform, FIG. 5B illustrates an exemplary low resolution system response waveform, and FIG. 5C illustrates an exemplary high resolution system response waveform.

The low resolution system response illustrated in FIG. 5B was obtained by sending CS1 and CS2 as test signals, as described above, and the high resolution system response data illustrated in FIG. 5C was obtained by sending CS2 and CS3 as test signals, as describe above. The full resolution system response illustrated in FIG. 5A was calculated as a sum of the low resolution system response data and the high resolution system response data.

As illustrated, for example, in FIG. 5B, low resolution system response data may characterize general system losses. Portion 506 of plot 502 illustrates loss associated with Rayleigh backscattering between amplifiers at 50 and 100 km. The low resolution system response may be useful, for example, in detecting changes in backscattering or amplifier function. The high resolution system response data shown in FIG. 5C may characterize localized changes. Portion 508 of plot 504, for example, clearly illustrates a 0.2 db extra fiber loss at an 80 km distance. This fiber loss discontinuity is not readily apparent in the low resolution system response data of FIG. 5B. FIG. 5A illustrates a full system response that may be a combination of the low and high resolution system responses. Portion 510 illustrates both generalized system response and localized changes in the system. Again, since the test signals are derived from a set of complementary code sequences, a user may elect to send both the high and resolution test signals and obtain full system response data, or to send only low or only high resolution test signals.

Figure 6:
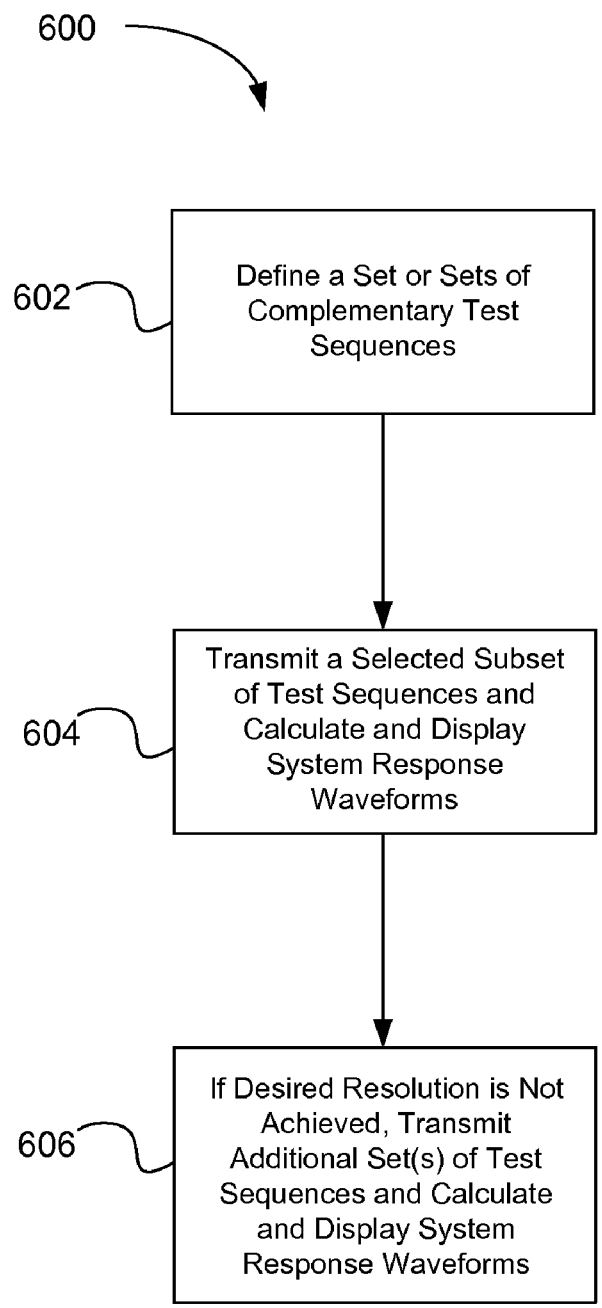
FIG. 6 is block flow diagram illustrating one example of an OTDR process consistent with the present disclosure.

FIG. 6 is a block flow diagram of one exemplary OTDR process 600 consistent with the present disclosure. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

In the exemplary embodiment illustrated in FIG. 6, a set or sets of complementary test sequences may be defined 602. A selected subset of test sequences may be transmitted 604 and system response waveforms may be calculated and displayed. If the desired resolution is not achieved as a result of transmission of the selected test sequences, additional sets of test sequences may be transmitted 606 and system response waveforms may be calculated and displayed.

Functionality of the OTDR equipment described herein may be implemented using one or more computer programs or applications, for example, running on a computer system such as the code processor 72 and or code generator 14. Such computer programs or applications may be stored on memory 71, or other machine readable medium (e.g., a hard disk, a CD Rom, a system memory, optical memory, etc.) for execution by a processor. It is expected that such a computer program product may be distributed as a removable machine-readable medium (e.g., a diskette, CD-ROM), preloaded with a system (e.g., on system ROM or fixed disk), or distributed from a server or electronic bulletin board over a network (e.g., the Internet or World Wide Web). Those of ordinary skill in the art will recognize that the OTDR equipment functionality may be implemented using any combination of hardware, software, and/or firmware to provide such functionality.

There is thus provided a system and method for optical time domain reflectometry (OTDR) using multi-resolution code sequences. According to one aspect of the disclosure, there is provided an optical time domain reflectometry system including: a code generator configured to generate a set of predefined complementary code sequences; and a correlator. The set of predefined complementary code sequences may include a plurality of first resolution code sequences and a plurality of second resolution code sequences, the first and second resolution code sequences having first and second frequency spectra, respectively, the first frequency spectra having a maximum at a first frequency and the second frequency spectra having a maximum at a second frequency different from the first frequency. The code generator may be configured to provide the first resolution code sequences as first resolution test signals for transmission on an optical communication system. The correlator may be configured to receive reflected portions of the first resolution test signals from the optical communication system as reflected first resolution test signals, and provide first resolution system response data from the first resolution code sequences and the reflected first resolution test signals. The code generator may be configured to provide the second resolution code sequences as second resolution test signals for transmission on the optical communication system. The correlator may be configured to receive reflected portions of the second resolution test signals from the optical communication system as reflected second resolution test signals, and provide second resolution system response data from the second resolution code sequences and the reflected second resolution test signals.

According to another aspect of the disclosure, there is provided an optical communication system including: a first optical fiber path for carrying signals in a first direction; a second optical fiber path for carrying signals in a second direction opposite from the first direction; a plurality of repeaters coupled to the first optical fiber path, each of the repeaters having an associated OTDR path coupled to the second optical fiber path; a code generator configured to generate a set of predefined complementary code sequences; and a correlator. The set of predefined complementary code sequences may include a plurality of first resolution code sequences and a plurality of second resolution code sequences, the first and second resolution code sequences having first and second frequency spectra, respectively, the first frequency spectra having a maximum at a first frequency and the second frequency spectra having a maximum at a second frequency different from the first frequency. The code generator may be configured to provide the first resolution code sequences as first resolution test signals for transmission on the first optical fiber path. The correlator may be configured to receive reflected portions of the first resolution test signals from the second optical fiber path as reflected first resolution test signals, and provide first resolution system response data from the first resolution code sequences and the reflected first resolution test signals. The code generator may be configured to provide the second resolution code sequences as second resolution test signals for transmission on the first optical fiber path. The correlator may be configured to receive reflected portions of the second resolution test signals from the second optical path as reflected second resolution test signals, and provide second resolution system response data from the second resolution code sequences and the reflected second resolution test signals.

According to another aspect of the disclosure, there is provided a method of performing time domain reflectometry in an optical communication system, the method including: defining a set of complementary code sequences, the set of complementary code sequences including a plurality of first resolution code sequences and a plurality of second resolution code sequences, the first and second resolution code sequences having first and second frequency spectra, respectively, the first frequency spectra having a maximum at a first frequency and the second frequency spectra having a maximum at a second frequency different from the first frequency; transmitting the first resolution code sequences as first resolution test signals on the optical communication system; receiving reflected portions of the first resolution test signals as first resolution reflected test signals from the optical communication system; and deriving first resolution system response data from the first resolution code sequences and the reflected first resolution test signals.

The embodiments that have been described herein are but some of the several which utilize this invention and are set forth here by way of illustration but not of limitation. Many other embodiments, which will be readily apparent to those of ordinary skill in the art, may be made without departing materially from the spirit and scope of the invention.

What is claimed is:

1. An optical time domain reflectometry system comprising:
    a code generator configured to be coupled to an optical communication system and to generate a set of predefined non-periodic complementary code sequences, said set of predefined non-periodic complementary code sequences comprising a plurality of first resolution code sequences and a plurality of second resolution code sequences, said first and second resolution code sequences having first and second frequency spectra, respectively, said first frequency spectra having a maximum at a first frequency and said second frequency spectra having a maximum at a second frequency different from said first frequency, said code generator being configured to provide said first resolution code sequences as first resolution test signals for transmission on said optical communication system; and
    a correlator configured to be coupled to said optical communication system and to receive reflected portions of said first resolution test signals from said optical communication system as reflected first resolution test signals, said correlator configured to provide first resolution system response data from said first resolution code sequences and said reflected first resolution test signals;
    said code generator being configured to provide said second resolution code sequences as second resolution test signals for transmission on said optical communication system;
    said correlator being configured to receive reflected portions of said second resolution test signals from said optical communication system as reflected second resolution test signals, said correlator configured to provide second resolution system response data from said second resolution code sequences and said reflected second resolution test signals.

2. An optical time domain reflectometry system according to claim 1, wherein said correlator is configured to provide third resolution system response data from said first resolution response data and said second resolution response data.

3. An optical time domain reflectometry system according to claim 1, said system comprising a user interface, and wherein said code generator is configured to selectively provide said first resolution code sequences or said second resolution test sequences as said first resolution test signals or said second resolution test signals, respectively, in response to an input from said user interface.

4. An optical time domain reflectometry system according to claim 1, wherein said first frequency is a lower frequency than said second frequency.

5. An optical time domain reflectometry system according to claim 1, wherein at least one of said first resolution code sequences comprises a first code sequence interleaved with said first code sequence.

6. An optical time domain reflectometry system according to claim 1, wherein at least one of said second resolution code sequences comprises a first code sequence interleaved with the negation of said first code sequence.

7. An optical time domain reflectometry system according to claim 1, wherein a first one of said first resolution code sequences comprises a first code sequence interleaved with said first code sequence, and a second one of said first resolution code sequences comprises a second code sequence interleaved with said second code sequence, and
    wherein a first one of said second resolution code sequences comprises said first code sequence interleaved a negation of said first code sequence, and a second one of said second resolution code sequences comprises said second code sequence interleaved a negation of said second code sequence.

8. An optical time domain reflectometry system according to claim 7, wherein said first and second code sequences are Golay sequences.

9. An optical time domain reflectometry system according to claim 1, wherein said code generator is configured to generate a plurality of different ones of said sets of predefined non-periodic complementary code sequences, said plurality of different ones of said sets of predefined non-periodic complementary code sequences being mutually orthogonal.

10. An optical communication system comprising:
    a first optical fiber path for carrying signals in a first direction;
    a second optical fiber path for carrying signals in a second direction opposite from said first direction;
    a plurality of repeaters coupled to said first optical fiber path, each of said repeaters having an associated optical time domain reflectometry (OTDR) path coupled to said second optical fiber path;
    a code generator configured to generate a set of predefined non-periodic complementary code sequences, said set of predefined non-periodic complementary code sequences comprising a plurality of first resolution code sequences and a plurality of second resolution code sequences, said first and second resolution code sequences having first and second frequency spectra, respectively, said first frequency spectra having a maximum at a first frequency and said second frequency spectra having a maximum at a second frequency different from said first frequency, said code generator being configured to provide said first resolution code sequences as first resolution test signals for transmission on said first optical fiber path; and
    a correlator configured to receive reflected portions of said first resolution test signals from said second optical fiber path as reflected first resolution test signals, said correlator configured to provide first resolution system response data from said first resolution code sequences and said reflected first resolution test signals;
    said code generator being configured to provide said second resolution code sequences as second resolution test signals for transmission on said first optical fiber path;
    said correlator being configured to receive reflected portions of said second resolution test signals from said second optical path as reflected second resolution test signals, said correlator configured to provide second resolution system response data from said second resolution code sequences and said reflected second resolution test signals.

11. An optical communication system according to claim 10, wherein said correlator is configured to provide third resolution system response data from said first resolution response data and said second resolution response data.

12. An optical communication system according to claim 10, said system comprising a user interface, and wherein said code generator is configured to selectively provide said first resolution code sequences or said second resolution test sequences as said first resolution test signals or said second resolution test signals, respectively, in response to an input to said user interface.

13. An optical communication system according to claim 10, wherein said first frequency is a lower frequency than said second frequency.

14. An optical communication system according to claim 10, wherein at least one of said first resolution code sequences comprises a first code sequence interleaved with said first code sequence.

15. An optical communication system according to claim 10, wherein at least one of said second resolution code sequences comprises a first code sequence interleaved with the negation of said first code sequence.

16. An optical communication system according to claim 10, wherein a first one of said first resolution code sequences comprises a first code sequence interleaved with said first code sequence, and a second one of said first resolution code sequences comprises a second code sequence interleaved with said second code sequence, and
wherein a first one of said second resolution code sequences comprises said first code sequence interleaved a negation of said first code sequence, and a second one of said second resolution code sequences comprises said second code sequence interleaved a negation of said second code sequence.

17. An optical communication system according to claim 16, wherein said first and second code sequences are Golay sequences.

18. An optical communication system according to claim 10, wherein said code generator is configured to generate a plurality of different ones of said sets of predefined non-periodic complementary code sequences, said plurality of different ones of said sets of predefined non-periodic complementary code sequences being mutually orthogonal.

19. A method of performing time domain reflectometry in an optical communication system, said method comprising:
defining a set of non-periodic complementary code sequences, said set of non-periodic complementary code sequences comprising a plurality of first resolution code sequences and a plurality of second resolution code sequences, said first and second resolution code sequences having first and second frequency spectra, respectively, said first frequency spectra having a maximum at a first frequency and said second frequency spectra having a maximum at a second frequency different from said first frequency;
transmitting said first resolution code sequences as first resolution test signals on said optical communication system;
receiving reflected portions of said first resolution test signals as first resolution reflected test signals from said optical communication system; and
deriving first resolution system response data from said first resolution code sequences and said reflected first resolution test signals.

20. A method according to claim 19, said method further comprising
transmitting said second resolution code sequences as second resolution test signals on said optical communication system;
receiving reflected portions of said second resolution test signals as second resolution reflected test signals from said optical communication system;
deriving second resolution system response data from said second resolution code sequences and said reflected second resolution test signals.

* * * * *